(12) United States Patent
Sladek et al.

(10) Patent No.: US 8,096,735 B2
(45) Date of Patent: Jan. 17, 2012

(54) CUTTING INSERT AND MILLING TOOL

(75) Inventors: Alfred Sladek, Fürth (DE); Andreas Wessel, Gelsenkirchen (DE); Carsten Schwaner, Mülheim a.d. Ruhr (DE); Martin Hausmann, Ratingen (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 630 days.

(21) Appl. No.: 12/282,360

(22) PCT Filed: Feb. 6, 2007

(86) PCT No.: PCT/DE2007/000209
§ 371 (c)(1),
(2), (4) Date: Sep. 10, 2008

(87) PCT Pub. No.: WO2007/104275
PCT Pub. Date: Sep. 20, 2007

(65) Prior Publication Data
US 2009/0052998 A1 Feb. 26, 2009

(30) Foreign Application Priority Data
Mar. 10, 2006 (DE) .......................... 10 2006 011 581

(51) Int. Cl.
*B23B 27/22* (2006.01)
*B23B 27/00* (2006.01)
(52) U.S. Cl. ........................ 407/114; 407/113
(58) Field of Classification Search .................. 407/113, 407/114, 115, 117
See application file for complete search history.

(56) References Cited

U.S. PATENT DOCUMENTS

| 4,189,264 | A | 2/1980 | Kraemer | 407/2 |
| 4,787,784 | A | 11/1988 | Bernadic et al. | |
| 5,044,840 | A * | 9/1991 | Fouquer et al. | 407/114 |
| 5,738,468 | A | 4/1998 | Boinjiu | 407/103 |
| 6,079,912 | A | 6/2000 | Rothballer | 407/114 |
| 6,164,878 | A | 12/2000 | Satran | 407/113 |
| 6,796,750 | B2 * | 9/2004 | Men | 407/35 |
| 6,948,889 | B2 * | 9/2005 | Arvidsson | 407/35 |
| 7,182,555 | B2 * | 2/2007 | Kitagawa et al. | 407/113 |
| 7,458,753 | B1 * | 12/2008 | Niebauer et al. | 407/113 |
| 7,530,769 | B2 * | 5/2009 | Kress et al. | 408/1 R |
| 7,637,700 | B2 * | 12/2009 | Nishio et al. | 407/33 |

FOREIGN PATENT DOCUMENTS

| DE | 19653921 A1 | 12/1995 |
| DE | 19703569 A1 | 1/1996 |
| DE | 19653921 | 7/1997 |
| EP | 0577573 A1 | 1/1995 |
| WO | 2005065874 A1 | 7/2005 |
| WO | WO-2005006587 | 7/2005 |

* cited by examiner

*Primary Examiner* — Will Fridie, Jr.
(74) *Attorney, Agent, or Firm* — Larry R. Meenan

(57) ABSTRACT

The invention relates to a cutting insert, in particular for a milling work, with a basic body which respectively has on opposite sides peripheral cutting edges, which protrude beyond the respectively adjoining face regions (15), descending at a positive rake angle, in the middle of which one or more planar supporting surfaces (16) are arranged, and with a central fastening hole (12) for receiving a tensioning screw. Arranged around the central fastening hole is at least one conical surface (19), with a cone descending inwards, i.e. towards the fastening hole.

13 Claims, 2 Drawing Sheets

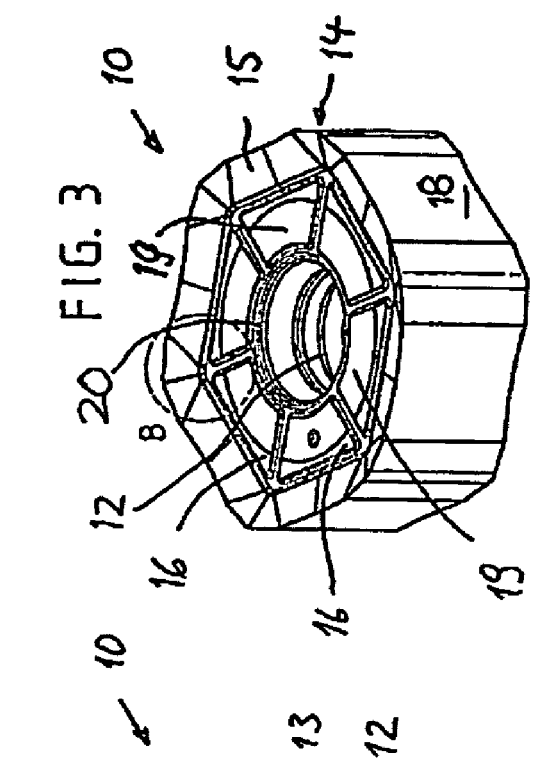

US 8,096,735 B2

CUTTING INSERT AND MILLING TOOL

CROSS REFERENCE TO RELATED APPLICATIONS

This application is the US national phase of PCT application PCT/DE2007/000209, filed 6 Feb. 2007, published 20 Sep. 1977 as WO 2007/104275, and claiming the priority of German patent application 102006001581.3 itself filed 10 Mar. 2006, whose entire disclosures are herewith incorporated by reference.

The invention relates to a cutting insert, in particular for milling work, having a base plate that has an annular array of cutting edges on opposite sides, which cutting edges project past the cutting surface areas adjacent to them that drop off at a positive cutting angle, among which one or more planar support surfaces are provided, and having a central mounting hole for accommodating a clamping screw.

The invention further relates to a milling tool, in particular a face milling tool, having a tool holder that has multiple seats each having one support surface and lateral contact surfaces.

U.S. Pat. No. 4,189,264 describes a cutting tool having a tool holder in whose seat, with one support surface and lateral contact surfaces, one substrate plate and one indexable plate are disposed, with the indexable plate having a lowered center area on both cutting surfaces compared to which the adjacent cutting edge areas surrounding it on the cutting edge are elevated in height. The planar, lowered center area surface mentioned above may be adapted to the support surface of a plate-shaped chip breaker on whose end an arm is provided that extends past the insert tip and is attached to the tool holder. The selected bank-like configuration of the cutting surface areas adjacent to the cutting edge has the disadvantage that the requirements for a soft chip removal, secure cutting control, and a stable cutting edge and cutting corner may be fulfilled only to a limited extent. The substrate plate has an annular array of seats on its edge whose depth is greater than the distance from the planar central region to the cutting edge plane, such that, in its clamped state, the raised central region of the substrate plate serves as the support surface for the opposing central region of the insert tip. The substrate plate and the insert tip are each provided with central through bores through which a clamping screw may be inserted. On the front, the substrate plate and the insert tip end flush with one another.

WO 1994/015741 discloses a cutting tool with a plate seat in a tool holder into which an indexable plate may be placed. On opposing cutting surfaces, the indexable plate has chip-forming grooves or bevels at a positive cutting angle running parallel to the cutting edge. In order to protect the cutting edges that are not currently active, the indexable plate has a groove in the region of each corner, the groove corresponding to raised protrusions on the bottom of the substrate plate. The protrusions and the grooves should rest against one another in the clamped state of the indexable plate clamped in a fixed manner on the substrate plate and should serve as a support by means of which the non-active cutting edges are held at a spacing from the substrate plate. The disadvantage of this configuration lies in the fact that a high degree of accuracy is required of the protrusions in question on the top of the substrate plate with regard to the corresponding grooves because otherwise the indexable plate cannot be clamped onto the desired standard dimensions. Particular difficulty results in the case of polygonal indexable plates having more than three sides because then, if there are any dimensional irregularities, no clearly definable seat is provided for the indexable plate on the substrate plate.

DE 196 53 921 therefore has the object of creating a secure, stable, repeatedly reproducible cutting plate seat in a tool holder, optionally with a durable, repeatedly reusable substrate plate, where the tool should be securely protected from soiling of the clamping system. Preferably, the cutting inserts used should be embodied as indexable plates usable in a double-sided fashion. In order to attain this object, the document suggests that the support surface in the tool holder itself or in the form of the surface of the substrate plate form a continuously closed raised surface for forming a raised bearing area that ends at a radial spacing from the plane defined by the free space plane of the indexable plate. The length of the distance from the bearing region should be greater than or equal to the radial distance from the plateau region to the cutting edge, up to a tolerance value. By the closed configuration of the support surfaces, the document intends to achieve an advantage with regard to precision in production over individual protrusions and/or troughs. However, the required grinding of the support surfaces requires an additional process step after sintering, which has a negative effect on the production costs of the cutting inert and thus the profitability of the chipping process. Omitting the surface grinding of the contact and/or support surfaces is possible in principle; however, irregularities in the surfaces that occur as a result of the sintering process must then be taken into account. The support surfaces become less even, such that the hold of the cutting inserts embodied as indexable plates in the holders becomes impaired.

In order to improve the profitability of the chipping processes in which cutting inserts are used, i.e. in order to minimize costs per workpiece produced, the production costs of the cutting inserts used should be as low as possible. Therefore, when using indexable plates for milling, it is important for the usability of each cutting insert to be as great as possible. At the same time, the chip removal performance should be optimized, i.e. the cutting insert should be configured with regard to its cutting edge and, optionally, the geometry of its cutting shape in such a way that a soft chip removal with a maximum rate of feed may be guaranteed. Using the double-sided polygonal indexable plates according to the prior art, a large number of effective cutting edges may be provided per indexable plate. Thus, for example, double-sided hexagonal indexable plates have a total of 12 effective cutting edges.

In order to produce as smooth a cut as possible, positive cutting angles are advantageous. In the case of double-sided indexable plates, this leads to projection of the cutting edge past the cutting surfaces. In order to be able to position the indexable plate in the tool, the holder must be exposed in the region of the cutting edges and the indexable plate must have a sufficient support surface that is as flat as possible because otherwise a lack of hold of the cutting insert in the tool may result and overloads on parts of the cutting edges may occur, causing the edges to ultimately break off, reducing its useful life. Aside from the fact that the use of substrate plates of the type described above is expensive, such substrate plates are able to eliminate the disadvantages listed above only to a limited degree.

The object of the present invention is to create a double-sided indexable plate with a large number of effective cutting edges that guarantees a secure and stable seating of the cutting insert, which is usable in a double-sided fashion, in the tool holder without the use of a substrate plate; this cutting insert should also be producible cost-effectively.

The further object of the present invention is to provide a milling tool that fulfills the requirements listed above.

The object is first attained by the cutting insert according to claim 1. According to the invention, this cutting insert is characterized in that at least one frustocone face is provided around the central mounting hole, the frustocone face tapering radially inward toward the mounting hole. The advantage of this cutting insert lies in the fact that, by the tapered region mentioned above, sintering irregularities of the cutting insert are corrected by tightening the mounting screw, such that the double-sided cutting insert rests in the tool holder in a secure and stable fashion.

Additional advantageous embodiments will be described in the dependent claims.

The taper angle, which is to be understood as the angle formed by the frustocone face to parallel support surfaces on opposite sides of the cutting insert, is selected to be relatively small; preferable values lie between 0.1° and 2°, in particular between 0.3° and 0.35°. In practical experiments, it was shown that these dimensions allowed sintering irregularities to be compensated out by tightening the mounting screw.

According to another embodiment, the frustocone face has an annular shape or is formed by an annular array of segmental frustocone faces that are preferably separated from one another by grooves. According to another embodiment of the invention, the grooves are provided in a star shape (relative to the central mounting hole), preferably at equidistant angles.

According to another embodiment of the invention additional flat support surfaces are provided next to the (slightly inclined) frustocone faces, specifically between the chip surfaces descending at a positive cutting angle and the frustocone faces or the one ring-shaped frustocone face. The support surfaces on opposing sides are provided parallel to one another. Preferably, adjacent support surfaces another are separated from each other by a respective groove. In the case of an n-gonal indexable plate, the support surfaces are limited by a circular arc on the inner side and by a straight line on the outside. Support surfaces are preferably smaller than the respective frustocone faces.

According to a further development of the invention, a groove is provided between the support surfaces mentioned above and the descending chip faces. The positive orientation of the chip removal surface subsequent to the cutting edge in conjunction with the groove allows the passing chip, assuming a sufficiently long chip face, to not come into contact with the support surface, such that any deposits there that may lead to inaccuracy in clamping after turning the cutting inserts may be effectively prevented.

Preferably, the cutting insert has a mirror-symmetrical structure relative to a central cross-section plane cutting through the central mounting hole such that, after turning, identical support and frustocone faces are present at the same points.

In particular, the cutting insert according to the invention is polygonal, for example, hexagonal when viewed from the top, and preferably in a rotationally symmetrical fashion. The cutting insert thus has six cutting corners and six equally long cutting edges, each pair forming one cutting corner.

As is known in principle from the prior art, a recess is provided around the mounting hole for centering a countersink screw during its installation.

The grooves are formed in such a way that they preferably have a groove floor and/or at least one descending side on each side. "Descending flank" is understood to mean the side wall of a groove that forms an angle greater than 90° with the floor of the groove. In the transition region of this descending flank and the respective bearing or frustocone face or chip faces, the outer edge to the groove flank may also have a rounded-off shape.

The present object is further attained by the milling tool according to claim 11. This milling tool has a tool holder having multiple seats each having one support surface and lateral contact surfaces, with a cutting insert of the type described above being installed in each seat. The cutting inserts may be mounted in the seats directly or indirectly via cassettes.

Additional advantages may be found in the drawings as well as the description of the drawings below. Therein:

FIG. 1 is a top view of a cutting insert according to the invention,

FIG. 2 is a side view of the cutting insert according to FIG. 1,

FIG. 3 is a perspective view of the cutting insert according to FIGS. 1 and 2, and FIG. 4 is a large-scale sectional view of the detail shown at "B" in FIG. 3.

Figure 5:
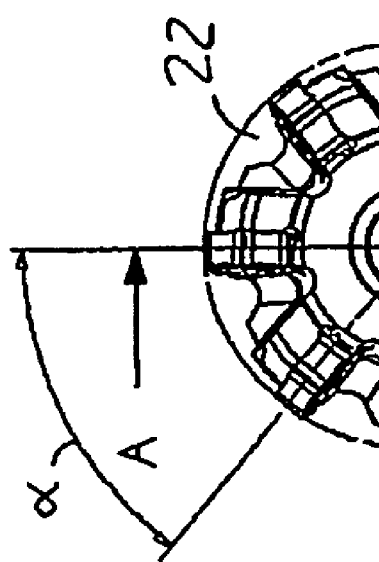
FIG. 5 is a top view of a face miller with seven cutting inserts.

The cutting insert 10 shown in FIGS. 1 to 3 is mirror-symmetric to a longitudinal central plane 11 shown in FIG. 2, which passes perpendicularly through a mounting hole 12 passing through the cutting insert 10. Moreover and as may be seen from FIGS. 1 and 3, the cutting insert 10 is also formed in a rotationally symmetrical fashion around a hole central axis 13, in the present case such that it is identical if rotated around this axis by 60°. The cutting insert has six cutting edges, with each two adjacent cutting edges forming a respective cutting corner. In the present case, the cutting corners 14 are not round but polygonal, i.e. formed by individual edge regions in the shape of straight lines. Descending chip faces 15 extend from each cutting edge and each cutting corner, preferably being set at the same uniform, positive chip angle and being designated uniformly with the reference 15 regardless of their position or shape. The cutting insert has flat support surfaces 16 that are separated from the descending chip faces 15 by a groove 17. This groove 17 has a flat groove floor as well as groove flanks that rise at an oblique angle on both sides. Optionally, the groove may also have multiple groove flanks that are inclined at an angle less than 180° to one another. Alternately, it is of course possible for convex transition areas to the surfaces 15 and 16 or concave transition areas to the base of the groove to be created.

Opposite the flat support surfaces 16 is a corresponding number of surfaces 16 with the same contour that are parallel to the surfaces 16 described above. Between the flat surfaces 16 mentioned above, each of which is perpendicular to the respective side face 18 (see FIG. 3), are frustocone faces 19 in the shape of ring segments and extending to a chamfer 20 of the mounting hole 12. These frustocone faces are oriented at an angle of 0.32° to the support surfaces 16 tapering radially inward, i.e. toward the mounting hole 12. Between each of the frustocone faces 19 in shaped as ring sections is another groove 21 that extends to the descending chip faces adjacent the cutting edges. As may be seen in particular from FIG. 4, the groove floor of the groove 21 not only lies in the same plane as the groove floor of the groove 17, but the grooves also merge into one another. The flanks of the groove 21 are also concave in their lower region and convex in their upper region. The groove floors of the grooves 17 and 21 lies in a common plane, specifically on the top as well as on the bottom of the cutting insert.

Figure 6:
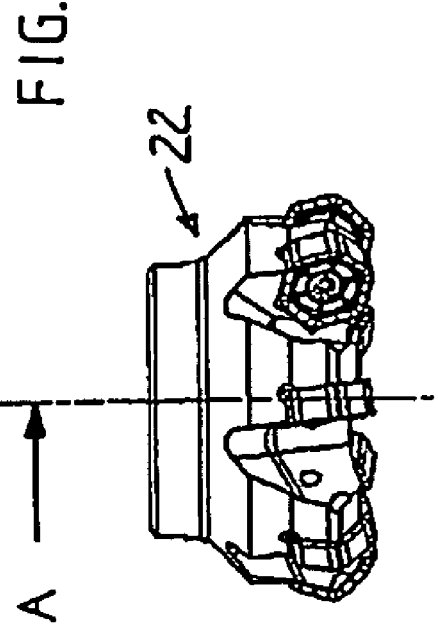
FIG. 6 is a side view of the face miller head according to FIG. 5.
Figure 7:
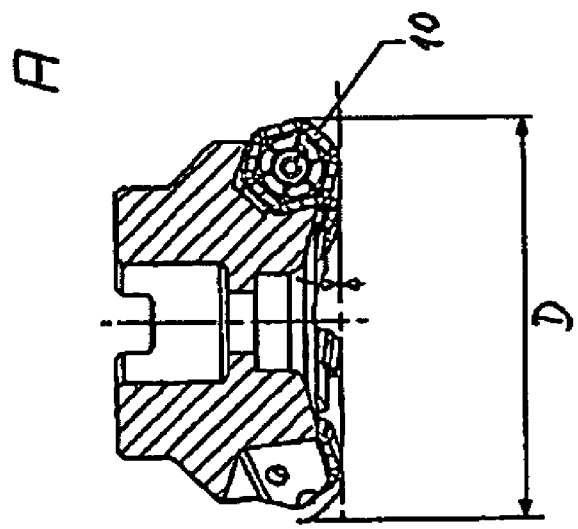
FIG. 7 is a section through of the face miller according to FIGS. 5 and 6.

Cutting inserts of the type shown in FIGS. 1 to 3 may be clamped radially in a face-milling tool head 22 as shown in FIGS. 5 to 7. For this purpose, the face-milling tool head has a tool holder with multiple seats each having a support surface and lateral contact surfaces. The lateral contact surfaces of the tool head are structured to correspond to the side faces 18 (free surfaces) of the cutting insert 10. In its clamped state, the contact surfaces of the knife head end below the cutting edge such that even the so-called inactive cutting edges are free. The cutting insert 10 is mounted by means of a mounting screw that is inserted through the mounting hole 12 and screwed into a threaded bore of the tool head. The support surface of the tool holder is flat and protrudes slightly past the regions of the tool head located approximately at the height of the cutting edges, such that even the (inactive) cutting edges facing the tool head are free and thus protected from damage. By tightening the mounting screw, the bottom of the cutting insert 10 is gradually moved toward the support surface until in contact with the surface. Because the recessed faces 19 and 16 are not located in one plane, as is common in the prior art, small irregularities in these surfaces existing after sintering may be compensated out by the clamping forces to be applied. This has the advantage that the faces 16 and 19 on the cutting insert no longer need be surface ground after sintering. In the present case, the face-milling tool head 22 has cutting inserts 10 that slightly overhang on the circumference as well as on the face. A cutting diameter D results from the cutting inserts 10, which are rotated. In the present case, seven cutting inserts are provided at an angular spacing from one another of α=360°/7. In principle, however, other arrangements are possible as well in which the angular spacings between neighboring cutting inserts are not equal.

Two cutting edges at a time (as the face blade and main blade) are used for cutting such that, by rotating the cutting inserts by 60°, fresh previously inactive cutting edges may be used. If all cutting edges on a cutting edge side have worn, the cutting insert is turned, i.e., rotated around the plane 11, such that the cutting edges on the other side are activated.

The invention claimed is:

1. A cutting insert comprising:
   plurality of cutting edges with each two adjacent cutting edges forming a respective cutting corner,
   a plurality of chip faces extending from each cutting edge and each cutting corner, and
   a plurality of frustocone faces disposed between the plurality of chip faces and a central mounting hole,
   wherein the plurality of frustocone faces are separated from the plurality of chip faces by a groove.

2. The cutting insert according to claim 1 wherein the plurality of frustocone faces are tapered radially inward toward the mounting hole at an angle between 0.1° and 2°.

3. The cutting insert according to claim 1 wherein the plurality of frustocone faces are separated from one another by a groove.

4. The cutting insert according to claim 3 wherein the groove separating the plurality of frustocone faces from one another extends in a radial direction from the central mounting hole to the groove separating the plurality of frustocone faces from the plurality of chip faces.

5. The cutting insert according to claim 1 wherein further comprising a plurality of support surfaces disposed between the plurality of chip faces and the plurality of frustocone faces.

6. The cutting insert according to claim 1 wherein the plurality of chip faces taper radially inward from the plurality of cutting edges toward the center mounting hole.

7. The cutting insert according to claim 1 wherein the cutting insert is mirror-symmetric with respect to a longitudinal central plane passing perpendicularly through the central mounting hole.

8. The cutting insert according to claim 1 wherein the cutting insert is rotationally symmetric with respect to a central axis of the center mounting hole.

9. The cutting insert according claim 1 further comprising a chamfer disposed about the mounting hole.

10. The cutting insert according to claim 1 wherein the groove has a planar floor and a flank on each side of the planar floor.

11. A milling tool comprising a tool holder with one or more seats, each seat having a support surface and lateral contact surfaces, wherein a cutting insert according to claim 1 is mounted in each seat.

12. The cutting insert according to claim 3 wherein the groove separating the plurality of frustocone faces from one another merges into the groove separating the plurality of support surfaces from the plurality of chip faces.

13. The cutting insert according to claim 2 wherein the angle is between 0.3° and 0.35°.

* * * * *